Aug. 10, 1943.    C. M. BELL    2,326,322
AUTOMATIC COLLET CHUCK
Filed Sept. 6, 1941    3 Sheets-Sheet 1
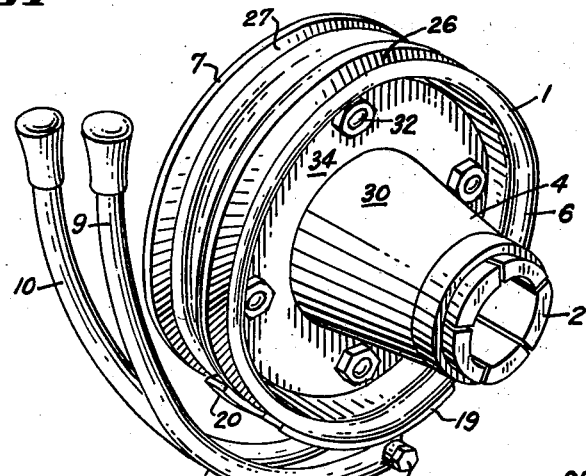
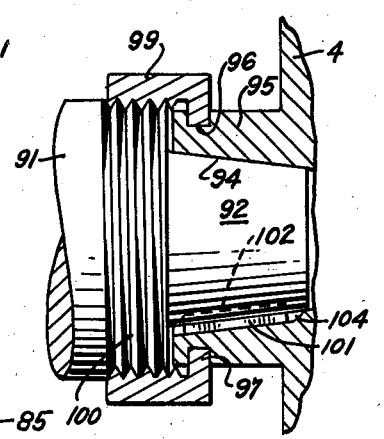
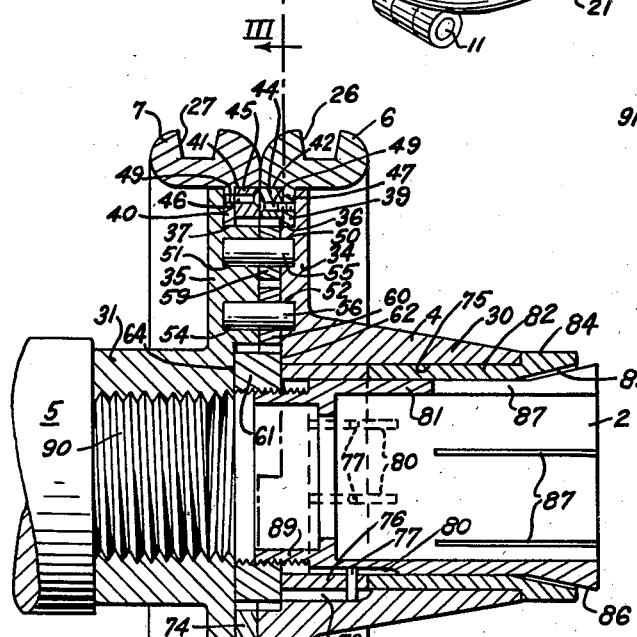
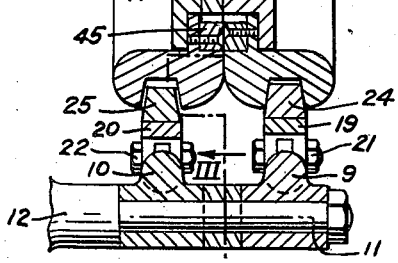
INVENTOR.
CURTIS M. BELL
BY
Chas. E. Townsend
ATTORNEY.

Aug. 10, 1943.  C. M. BELL  2,326,322
AUTOMATIC COLLET CHUCK
Filed Sept. 6, 1941  3 Sheets-Sheet 2
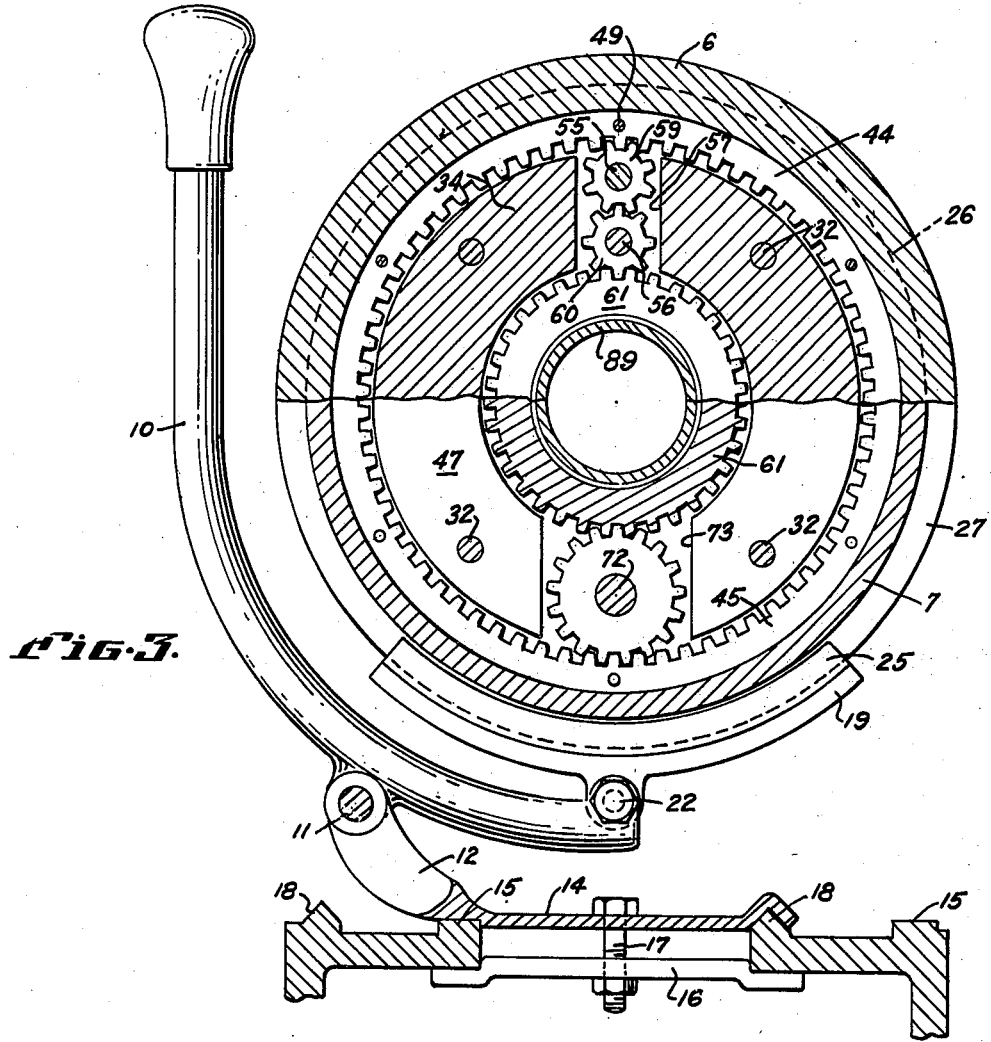
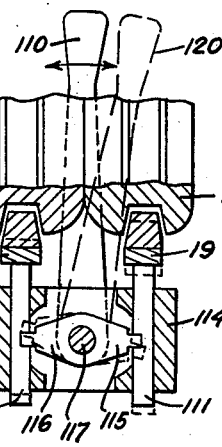
INVENTOR.
CURTIS M. BELL
BY
Chas. E. Townsend
ATTORNEY.

Aug. 10, 1943. C. M. BELL 2,326,322
AUTOMATIC COLLET CHUCK
Filed Sept. 6, 1941 3 Sheets-Sheet 3

INVENTOR.
CURTIS M. BELL
BY
Chas. E. Townsend
ATTORNEY.

Patented Aug. 10, 1943

2,326,322

UNITED STATES PATENT OFFICE 2,326,322

AUTOMATIC COLLET CHUCK

Curtis M. Bell, Berkeley, Calif.

Application September 6, 1941, Serial No. 409,875

5 Claims. (Cl. 279—53)

The present invention relates to lathe chucks, and particularly to a collet chuck which can be released or engaged without stopping the lathe.

It is a considerable advantage in the quantity production of articles on a lathe to be able to insert the rough part and remove the finished piece without stopping the machine. Particularly is this true where a short, simple operation is to be performed and the time for stopping and starting the lathe would be a very great proportion of the total time available for operation.

Various automatic brakes have been developed for this purpose but are unsatisfactory, due to a multiplicity of parts and consequent increase in first cost and in maintenance.

My invention permits accurate centering, clamping and release of the work without interfering in any way with the continuous rotation of the lathe. This result is accomplished by changing the collet position through planetary gearing rendered operative by braking mechanism controlled through a brake lever or through manual pressure on a brake drum by the lathe attendant.

An object of my invention is thus, primarily, to increase the speed and economy of operation of a lathe. Another object is to provide for the rapid and automatic centering of work inserted in a rotating chuck. A further object is to provide means for clamping and unclamping work in a lathe chuck while the latter is rotating at a constant speed. Yet another object is to adapt a lathe to continuous production of parts requiring a single operation. These and other objects will be apparent to those skilled in the art from the disclosure of my invention in the drawings and specification forming a part of this application.

This invention is deemed equally applicable to such other purposes as will occur to those familiar with this field, and any modifications in the details of construction which may be necessary for such purposes are deemed to fall within the scope of my invention as defined in the appended claims.

Briefly, my invention comprises interposing a pair of brake drums and a differential gear train between the head spindle and the collet, and tightening or releasing the collet by retarding one or the other of the drums while the spindle and collet continue to rotate in unison.

The invention has been illustrated in the drawings, wherein:

Fig. 1 is a perspective view of the assembled form of my invention.

Fig. 2 is a longitudinal, sectional view of the device of Fig. 1 shown attached to a lathe.

Fig. 3 is a transverse, fragmentary, sectional view of my invention, showing the collet-actuating gears in the planes indicated by lines III—III of Fig. 2.

Fig. 4 is a fragmentary, sectional view, illustrating an alternative structure for attaching the chuck to the spindle.

Fig. 5 is a schematic, sectional view, illustrating an alternative form of the control lever mechanism used with my invention.

Figure 6:
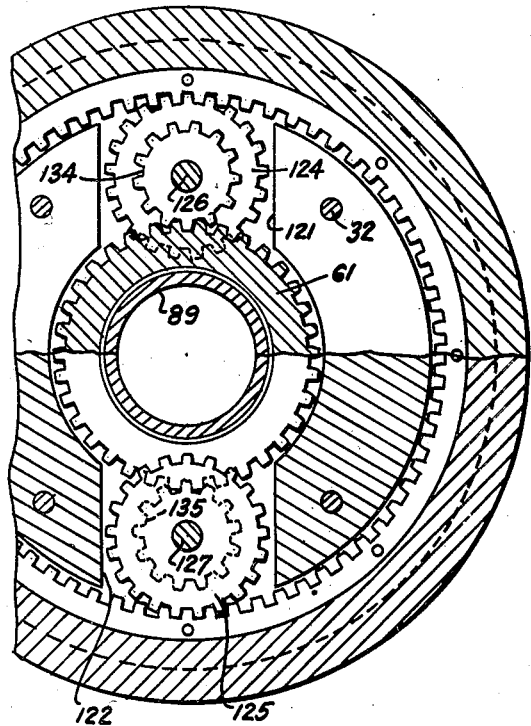
Fig. 6 is a fragmentary, transverse section, showing an alternative gear arrangement, taken as indicated by lines VI—VI of Fig. 7.

In Fig. 1, I have shown a preferred embodiment of the automatic collet chuck of my invention, detached from the lathe with which it is to be used and indicated generally by the reference character 1. The lathe may be of any conventional type and has not been illustrated, since it is not a part of the present invention.

The assembly 1 includes a split collet 2, mounted in a chuck hub 4 which may be secured to the head spindle 5 (shown in Fig. 2) of a lathe. The collet 2 is engaged with, or released from, stock to be machined through the rotation relative to hub 4 of tightening brake drum 6 or releasing brake device 7. The head spindle 5 will be assumed, for purposes of this description, to be rotating continuously during operation in a counterclockwise direction, as seen in Fig. 1. Relative rotation between head spindle 5 and the drum 6 or 7 is produced in response to braking action against the drums by gearing within hub 4, to be described hereafter. Drums 6 and 7 are smooth surfaced and rounded on the corners so that they may be controlled by pressure directly thereagainst of the operator's hand, if desired.

Tightening brake lever 9 and releasing brake lever 10 are rockably mounted on a common shaft 11, in turn secured by a jig 12 to the lathe bed. The jig 12 may be made in two pieces, an upper member 14 shaped to fit over the inner tracks 15 and 18 of the lathe, and a bottom plate 16, through which a bolt 17 is disposed to clamp the jig elements together and to the lathe. Jig 12 has been shown as shaped to fit lathe tracks of alternate flap shape 15 and inverted V-shape 18. Obviously, however, the jig may be shaped to fit any combination of track shapes.

Brake levers 9 and 10 are curved and shaft 11 so disposed, in relation thereto, that they project as little as possible beyond the chuck and thus do not get in the lathe attendant's way.

Arcuate brake shoes 19 and 20 are attached, by pivots 21 and 22, to the tightening and releasing brake levers 9 and 10, respectively, and V-type brake linings 24 and 25 are riveted thereto for direct engagement with the brake drums. Pivots 21 and 22 are preferably aligned vertically with the spindle 5.

Peripheral grooves 26 and 27 of truncated V-shape are formed about the drums 6 and 7 to engage the arcuate brake shoes 19 and 20, respectively. The interior gearing arrangement within hub 4 is utilized to translate a braking effect at the periphery of drum 6 or 7 into clamping or releasing of the work. Hub 4 is made in two parts, a collet-controlling hub portion 30 and a spindle-engaging hub portion 31. These parts are secured together by symmetrically-spaced bolts 32, passing through radially extended flanges 34 and 35 formed integrally with hub portions 30 and 31, respectively.

Figure 8:
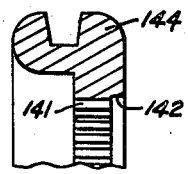
Fig. 8 is a fragmentary view of an alternative brake drum and internal gear construction.

An annular portion is machined out of the adjacent peripheral edges of each of the flanges 34 and 35 to define seats 36 and 37 for rotating fit reception therebetween of flanges 39 and 40, extending radially inward from drums 6 and 7, respectively. When assembled, flanges 39 and 40 cooperate with seats 36 and 37 to retain the drums 6 and 7 in proper relation axially of the hub 4 while freely permitting rotation relative to hub 4 or to each other. The adjacent portions of flanges 39 and 40 are cut out, forming annular seats 41 and 42 to receive internal ring gears 44 and 45 flush with the adjacent inner faces 46 and 47 of drums 6 and 7. Gears 44 and 45 may be press-fitted into seats 41 and 42 and additionally secured, as by bolts 49, to the drums 6 and 7. Alternatively, gears 44 and 45 may be formed integrally with drums 6 and 7, as shown in Fig. 8. Flange 40 is reduced in radial extent below the roots of teeth 141, as shown at 142, or even eliminated entirely, so that the teeth may be broached out in one simple operation to produce a unified gear and drum 144. The gears 44 and 45 are the first links in the gear train converting rotation of drums 6 and 7 relative to hub 4 into gripping or releasing action by the collet 2.

The adjacent faces 46 and 47 of flanges 34 and 35 are bored in alignment at 50 and 51 and at 52 and 54 to act as journals for the reception of stub shafts 55 and 56. A recess 57 is cut around bores 50 and 52 into the inner face 47 of flange 34 to receive meshing pinions 59 and 60, rotating freely on stub shafts 55 and 56. Outer pinion 59 meshes with ring gear 44 while inner pinion 60 meshes with half the axial extent of the teeth of a wide externally toothed and internally threaded collar or ring gear 61. Cooperating annular seats 62 and 64 are cut into the inner peripheries of adjacent flange faces 46 and 47. Seats 62 and 64 are proportioned so that the collar 61 is freely rotatable therein but is restrained against axial movement.

Diametrically opposite pinions 59 and 60, bores 70 and 71 are formed in alignment in adjacent flange faces 46 and 47 to act as journals for a stub shaft 72, on which is mounted in a recess 73 cut into inner flange face 47, a pinion 74 meshing outwardly with ring gear 45 and inwardly with the remaining half of the axial extent of wide toothed collar 61. I prefer to make the pinions and shafts on opposite sides of the device of such mass that there will always be both a static and a dynamic balance to prevent vibration. In some cases it may be necessary to use two complete sets of pinions displaced 90° from each other to achieve this aim.

If the brake lever 9 is operated by the lathe attendant, drum 6 will be retarded; and by the engagement of internal gear 44, through pinions 59 and 60, with collar 61, the latter will be driven clockwise relative to hub 4. Conversely, if lever 10 is operated, drum 7 will be retarded and collar 61 driven counterclockwise relative to drum 4. In some cases where only light pressure is required to grip the stock, the attendant can operate the collet by manual pressure against the brake drums and need not use the brake lever and shoe. I utilize this optional direction of rotation of collar 61 relative to hub 4 to grip or release work by making my collet 2 in a preferred form and engaging it threadably within collar 61.

Collet-controlling hub 30 is bored at 75 to receive for about one-third its length an inner sleeve 76, press-fitted therein and further prevented from rotating by a stud 77 projecting both inwardly and outwardly therefrom. A keyway 79, cut into hub bore 75, receives stud 77 outwardly of sleeve 76, which projects inwardly into engagement with a keyway 80, cut in cylindrical body portion 81 of collet 2, which makes a sliding fit within sleeves 76 and 82. Thus collet 2 may move axially of hub 30 but can not revolve therein. For heavy work, it is desirable to use a plurality of symmetrically disposed keyways and studs, as shown in dotted lines. The two-thirds of the length of bore 62 has press-fitted therein an outer sleeve 82, which is flanged outwardly at 84 beyond the end of hub 30. The outer flanged portion 84 is tapered inwardly at 85. I prefer to case-harden the entire outer sleeve member 82 or to form it of alloy steels of great hardness and toughness. Alternatively, sleeves 76 and 82 might be made in one piece and only the outer end portion hardened.

Inwardly tapering sleeve surface 85 constitutes a seat, against which a corresponding taper 86, formed terminally on collet 2, may engage when the collet is traversed axially to the left (see Fig. 2). The collet body 81 is slotted at 87 for over half its length. I prefer to cut five symmetrically disposed slots, as this number appears to provide a more even gripping action. Obviously, a greater number of slots could be used, but fewer than three is not desirable, since they then prevent evenness of action which is essential to self-centering of inserted work. Similarly, the use of a plurality of studs 77 and keyways 79 and 80, spaced between adjacent slots 87, equalizes the stresses developed in the collet when engaging and disengaging work.

Since my collet chuck is designed for mass production of one particular piece, it is not necessary that the collet accommodate stock of widely differing dimensions. If different sizes of parts are to be machined, a suitable size of collet may be used for each size of part.

At the inner end of collet body portion 81 I form a reduced diameter section 89, externally threaded to engage within collar 61. Rotation of collar 61 relative to hub 4 will drive collet 2 axially, releasing the work if traversed to the right, or gripping it, if traversed to the left, to engage the tapered collet surface 86 with the tapered surface 85 of the sleeve liner 82.

Conventionally, right-hand threads are used on the threaded portion 90 of head spindle 5 and in a chuck to keep it firmly attached to the head during operation. In some types of lathes automatic brakes are used which are so rapid in their action as to cause the chuck to unscrew from the spindle by its own inertia. Again, it is often desirable to operate the lathe in the opposite direction to that assumed for purposes of description. Hence, sometimes I prefer to modify the spindle-engaging hub 31, as illustrated schematically in Fig. 4.

In Fig. 4, I have illustrated a spindle 91, having a tapered engaging surface 92, onto which fits a tapered bore 94 formed in spindle-engaging portion 95 of hub 4. An annular locking groove 96 is cut about hub portion 95 to receive a radial locking flange 97 formed integrally with a threaded cap 99. Cooperating threads 100 on spindle 91, lock cap 99 and hub 95 thereto, while a key 101, set in spindle keyway 102 and hub keyway 104, prevents rotation of the hub 4 relative to the spindle 91, regardless of the direction of the forces acting on the chuck.

In Fig. 5, I have illustrated an alternative embodiment of the brake control means, using a single control arm 110 instead of the two arms 9 and 10, shown in Fig. 1. Brake shoes 19 and 20 are supported on brake rods 111 and 112, vertically journaled in a housing member 114 attached to the lathe bed (not shown) by conventional means. Levers 115 and 116 extend from control arm 110 into engagement with rods 111 and 112. If arm 110 is rocked on its pivotal mounting 117 to the right, as shown in dotted position 120, rod 111 will force brake shoe 20 into engagement with drum 6, causing the collet to grip a piece to be machined.

Figure 7:
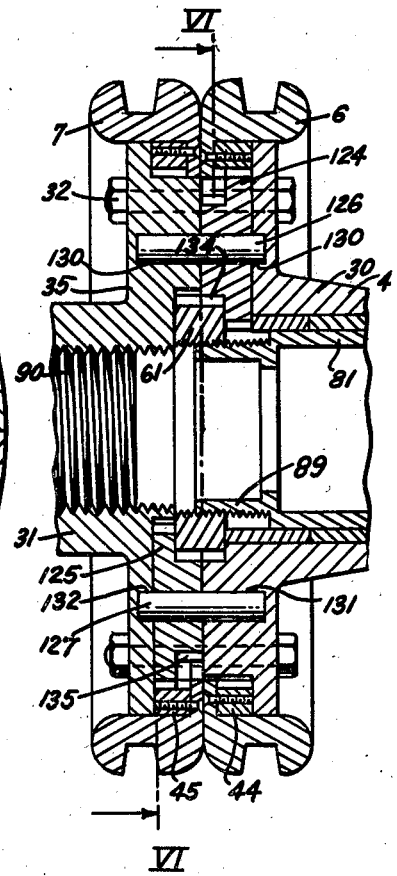
Fig. 7 is a transverse, sectional view of the embodiment of Fig. 6.

In Figs. 6 and 7, I have shown an alternative gearing arrangement within drum 4 which is designed to meet unusually heavy torque requirements in gripping the work. Adjacent faces 46 and 47 of drum flanges 34 and 35 are recessed at 121 and 122 to accommodate gears 124 and 125 meshing with ring gears 44 and 45, respectively. Gears 124 and 125 are freely rotatable on stud shafts 126 and 127, journaled in aligned bores 129 and 130 and 131 and 132 formed in flanges 34 and 35, respectively. Each of gears 124 and 125 has formed integrally therewith a spur gear 134 and 135, respectively, having a tooth ratio of about 3:1 to effect a reduction in speed and consequent increase in torque transmitted to the collar 61. Spur gear 134 meshes with half the wide gear teeth of collar 61 and links it with ring gear 44. Spur gear 135 meshes with the remaining half width of the teeth on collar 61, linking it with ring gear 45. The operation, by retarding drum 6 or 7 with the brake, is identical with that described above. In this embodiment, when holding light work it is only necessary to touch the hand with a small pressure to the drum surface to control the collet. In this embodiment also it is desirable to balance the rotating unit statically and dynamically, and it may be desirable in some cases to provide a duplicate set of pinions displaced 90° from those shown, as suggested above in regard to the embodiment of Fig. 1. I also may wish to use a one-piece brake drum and ring gear construction, as described in connection with Fig. 8.

In summary, it will be seen that I have provided a device with but few moving parts and of simple construction for the rapid release or gripping of work to be machined. The operator needs no special skill to use it, and yet his output on mass projection jobs is very much increased by cutting out waste time in stopping and starting his lathe.

While I have described my device in conjunction with a lathe, it will be obvious that it is equally applicable to any machine in which parts are to be chucked for any sort of turning, grinding, buffing or finishing operation.

I claim:

1. A device for releasing and gripping stock in a lathe during continuous rotation thereof, comprising a pair of independently operable brake drums mounted on the head spindle of said lathe, differential gearing operable between said drums and a collet-actuating, internally threaded ring gear, a split collet threadably engaged with said ring gear and operable to grip and release stock by axial traversal, brake means selectively operable against said drums comprising a mounting member arranged to be secured to said lathe by a single bolt, brake rods slidably disposed in said mounting member, brake shoes fixed to said rods, a single control lever, and means for moving said rods by said lever to engage said shoes alternatively with said drums.

2. A chuck arranged for gripping and releasing stock during continuous chuck rotation, comprising a flanged mounting hub arranged to be secured to a power source, a flanged collet-receiving hub secured rigidly to said mounting hub, a bore formed in said collet-receiving hub, a hardened liner secured in said bore, a flared collet-engaging surface formed at the outer end of said liner, a split collet disposed slidably within said liner, means for preventing rotation of said collet and said liner within said bore, a tapered surface formed about the outer end of said collet and arranged to cooperate with said flared liner surface to compress and release said split collet portion when said collet is reciprocated axially of said hub, cooperating recesses formed coaxially within said hubs, an internally threaded ring gear disposed within said cooperating recesses, threads formed about the inner end of said collet and engaging threadably with said ring gear, cooperating recesses and bores formed in the adjacent faces of said hub flanges, differential gearing disposed in said recesses and meshing with said ring gear, annular recesses formed peripherally of the adjacent faces of said flanges, a pair of annular brake drums disposed concentrically about said hubs and extending radially into said annular recesses, internal gears formed on said drums within said annular recesses and meshing with said differential gearing, and braking means selectively engaging said drums and actuated by a single lever.

3. A chuck arranged for gripping and releasing stock during continuous chuck rotation, comprising a flanged mounting hub arranged to be secured to a power source, a flanged collet-receiving hub secured rigidly to said mounting hub, a bore formed in said collet-receiving hub, a hardened liner secured in said bore, a flared collet-engaging surface formed at the outer end of said liner, a split collet disposed slidably within said liner, means for preventing rotation of said collet and said liner within said bore, a tapered surface formed about the outer end of said collet and arranged to cooperate with said flared liner surface to compress and release said split collet portion when said collet is reciprocated axially of said hub, cooperating recesses formed coaxially within said hubs, an internally threaded ring gear disposed within said cooperating recesses; threads formed about the inner end of said collet and engaging threadably with said ring gear, an annular chamber cut peripherally into the flanged portion of each of said hubs, a pair of annular brake drums disposed about said hubs, an internal gear on each of said drums extending concentrically into said annular chamber, two sets of journals formed in alignment in said flanges, a shaft disposed in each of said sets of journals, a pinion mounted on one of said shafts and meshing with said internal gear on one of said drums, a pinion mounted on the other of said shafts meshing with said first-mentioned pinion and with said internally threaded ring gear, a third set of journals formed in said hub flanges and angularly displaced from the previously mentioned sets, a shaft disposed therein, and a pinion mounted on said shaft meshing with the other of said drum internal gears and with said ring gear.

4. A chuck arranged for gripping and releasing stock during continuous chuck rotation, comprising a flanged mounting hub arranged to be secured to a power source, a flanged collet-receiving hub secured rigidly to said mounting hub, a bore formed in said collet-receiving hub, a hardened liner secured in said bore, a flared collet-engaging surface formed at the outer end of said liner, a split collet disposed slidably within said liner, means for preventing rotation of said collet and said liner within said bore, a tapered surface formed about the outer end of said collet and arranged to cooperate with said flared liner surface to compress and release said split collet portion when said collet is reciprocated axially of said hub, cooperating recesses formed coaxially within said hubs, an internally threaded ring gear disposed within said cooperating recesses, threads formed about the inner end of said collet and engaging threadably with said ring gear, an annular chamber cut peripherally into the flanged portion of each of said hubs, a pair of annular brake drums disposed about said hubs, an internal gear on each of said drums extending concentrically into said annular chamber, two sets of journals formed in alignment in said flanges, a shaft disposed in each of said sets of journals, a pinion mounted on one of said shafts and meshing with said internal gear on one of said drums, a pinion mounted on the other of said shafts meshing with said first-mentioned pinion and with said internally threaded ring gear, a third set of journals formed in said hub flanges and angularly displaced from the previously mentioned sets, a shaft disposed therein, a pinion mounted on said shaft meshing with the other of said drum internal gears and with said ring gear, and braking means independently operable against said drums fixedly mounted relative thereto and actuated by a single lever.

5. A chuck arranged for gripping and releasing stock during continuous chuck rotation, comprising a flanged mounting hub arranged to be secured to a power source, a flanged collet-receiving hub secured rigidly to said mounting hub, a bore formed in said collet-receiving hub, a hardened liner secured in said bore, a flared collet-engaging surface formed at the outer end of said liner, a split collet disposed slidably within said liner, means for preventing rotation of said collet and said liner within said bore, a tapered surface formed about the outer end of said collet and arranged to cooperate with said flared liner surface to compress and release said split collet portion when said collet is reciprocated axially of said hub, cooperating recesses formed coaxially within said hubs, an internally threaded ring gear disposed within said cooperating recesses, threads formed about the inner end of said collet and engaging threadably with said ring gear, an annular chamber cut peripherally into the flanged portion of each of said hubs, a pair of annular brake drums disposed about said hubs, an internal gear on each of said drums extending concentrically into said annular chamber, cooperating gear recesses formed in the adjacent faces of said hub flanges, reduction gears disposed in said recesses meshing with said ring gear and meshing separately with said drum internal gears, and braking means mounted independently of said chuck and arranged for alternative engagement with said drums and actuated by a single lever.

CURTIS M. BELL.